(12) United States Patent
Klose et al.

(10) Patent No.: US 10,730,033 B2
(45) Date of Patent: Aug. 4, 2020

(54) METHOD AND DEVICE FOR THE HYDROLYSIS OF A COMPOUND

(71) Applicant: WACKER CHEMIE AG, Munich (DE)

(72) Inventors: Göran Klose, Massing (DE); Albert Hofmann, Ering (DE); Helene Maier, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 16/488,144

(22) PCT Filed: Feb. 23, 2017

(86) PCT No.: PCT/EP2017/054204
§ 371 (c)(1),
(2) Date: Aug. 22, 2019

(87) PCT Pub. No.: WO2018/153463
PCT Pub. Date: Aug. 30, 2018

(65) Prior Publication Data
US 2020/0030769 A1    Jan. 30, 2020

(51) Int. Cl.
*B01J 19/24* (2006.01)
*B01J 4/00* (2006.01)
*B01J 19/00* (2006.01)

(52) U.S. Cl.
CPC ............. *B01J 19/244* (2013.01); *B01J 4/002* (2013.01); *B01J 19/002* (2013.01); *B01J 2219/00252* (2013.01); *B01J 2219/2401* (2013.01)

(58) Field of Classification Search
CPC ........ B01J 19/244; B01J 19/002; B01J 19/26; B01J 4/002; B01J 2219/00252; B01J 2219/2401; C01B 13/326; C01B 13/328
See application file for complete search history.

(56) References Cited

U.S. PATENT DOCUMENTS

| 4,252,780 A | 2/1981 | Koppl et al. |
| 6,079,225 A | 6/2000 | Ruppert et al. |
| 2012/0076706 A1 | 3/2012 | Bonso |

FOREIGN PATENT DOCUMENTS

| CN | 106224302 A | 12/2016 |
| DE | 2820617 A1 | 11/1979 |

(Continued)

*Primary Examiner* — Lessanework Seifu
(74) *Attorney, Agent, or Firm* — Brooks Kushman P.C.

(57) ABSTRACT

The subject matter of the invention is a device for the hydrolysis of at least one compound. The device comprises a first cylindrical section having a diameter $D_{max}$, a central duct, an outer duct which surrounds the central duct coaxially, an outlet having a diameter $D_A$, and a second section which tapers towards the outlet and into which the ducts issue. The second section has, in cross-section along a longitudinal axis $A_L$ of the device, a profile which is described by two radii R1 and R2 which merge tangentially into each other, where $0.2 < R1/D_A < 4.0$ and $0.3 < R2/D_A < 5.0$. The invention also relates to a method for the hydrolysis of at least one compound. In the method, the device is used to conduct water at least through the outer duct and to conduct the compound to be hydrolysed through the central duct and/or through at least one intermediate duct and to mix them with each other at least partially in the second section. The compound and the water are in liquid form.

24 Claims, 2 Drawing Sheets

(56) References Cited

FOREIGN PATENT DOCUMENTS

| | | |
|---|---|---|
| DE | 19725955 C1 | 1/1999 |
| EP | 1892458 A1 | 2/2008 |
| EP | 2434002 A1 | 3/2012 |
| WO | 09037923 A1 | 3/2009 |

METHOD AND DEVICE FOR THE HYDROLYSIS OF A COMPOUND

CROSS-REFERENCE TO RELATED APPLICATIONS

This application is a U.S. National Phase Application of PCT/EP2017/054204, filed Feb. 23, 2017 the contents of which are incorporated herein by reference in their entireties for all purposes.

FIELD OF THE INVENTION

The invention relates to a device and a method for hydrolyzing a compound.

BACKGROUND OF THE INVENTION

The reaction products occurring, for example, in the production of polysilicon generally contain hydrogen, chlorosilanes and hydrogen chloride. These can, particularly in moist air, have a highly corrosive action and can additionally be spontaneously flammable due to a proportion of polymeric silicon-hydrogen chloride compounds. The offgases are therefore usually subjected to a work-up in which hazardous components react and are converted into nonhazardous or less hazardous components. Such a work-up can, for example, encompass hydrolysis steps in which a chemical compound is dissociated by reaction with water. Chlorosilanes can be removed by treatment with water, for example to form their hydrolysis products (e.g. $RSi(OH)_3$), and be separated off.

Particularly in the preparation of trichlorosilane (TCS), which serves as starting material for the production of polysilicon, from hydrogen chloride and metallurgical silicon, a fraction comprising chlorosilicon compounds whose boiling range is basically from about 40 to 160° C. is usually formed. This fraction, which is generally referred to as high boiler or high boiler mixture, can comprise chlorodisilanes, chlorodisiloxanes, metal chlorides, dopants and also trichlorosilanes and tetrachlorosilanes. Since some of the compounds mentioned can have similar boiling points, separation of such high boilers by distillation is generally associated with a large outlay. For this reason, the high boilers are separated off from the other chlorosilanes and subsequently reacted, usually by means of hydrolysis.

DE 28 20 617 A1 discloses, for example, a method in which the hydrolysis of a high boiler mixture is carried out in a tube (hydrocyclone) which tapers conically in a downward direction. The high boiler mixture comprises chlorosilanes. Water is fed in tangentially from above, at the top of the hydrocyclone, as a result of which a rotating cone of water is formed. The liquid high boiler mixture is sprayed together with an inert carrier gas through a two-fluid or two-channel nozzle into the cone of water, likewise at the top of the hydrocyclone. Rapid and uniform reaction can be ensured by the large surface area of water and the fine dispersion of the high boiler mixture in the form of the spray jet.

However, interruptions to the hydrolysis process can occur in the case of such methods. These interruptions can, in particular, occur as a result of blockages and deposits in the form of solid or gel-like silica in the region of the two-fluid nozzle and the conical tube. Particularly in the region close to the nozzle, blockages can occur as a result of contact of the finely dispersed (atomized) high boilers with water vapor. Cleaning work frequently has to be carried out, and this results in lower plant availability and thus higher production costs. It can be quite normal for a hydrocyclone as per the above example to have to be subjected to cleaning on average once per day.

WO 2009/037923 A1 describes a device for vapor-phase hydrolysis in which the compound to be hydrolyzed is mixed with water and an inert carrier gas in a combustion space by means of a three-fluid or three-channel nozzle. The mixing and thus the hydrolysis of the compound occurs mainly at the nozzle outlet.

However, occurrence of recirculation zones (turbulences) in the region downstream of the nozzle can occur in the device described. Deposits preferentially arise in these zones of low flow velocity since carrying-away of the hydrolysis products formed is no longer ensured. Furthermore, the hydrolysis is carried out in a temperature range from 850 to 1100° C. Operation of the device in this temperature range requires a considerable engineering outlay (especially cooling and heating).

BRIEF SUMMARY OF THE INVENTION

It was therefore an object of the invention to provide a maintenance-free device for hydrolyzing compounds, in the case of which the disadvantages known from the prior art do not occur. The hydrolysis should also take place in a temperature range which makes relatively low demands on materials.

This object is achieved by a device having the features of claim 1 and by a method having the features of claim 10.

The device of the invention for hydrolyzing at least one compound is preferably a nozzle or discharge device which comprises a first cylindrical section and a second tapering section and also at least two channels, namely a central channel and an outer channel. The longitudinal axis $A_L$ preferably runs centrally through the central channel and preferably likewise centrally through the outlet. The outer channel coaxially surrounds the central channel. In principle, any medium in liquid or gaseous form can be conveyed through each channel. The device can therefore also be referred to as, for example, multifluid or multicomponent nozzle.

DETAILED DESCRIPTION OF PREFERRED EMBODIMENTS

Figure 1:
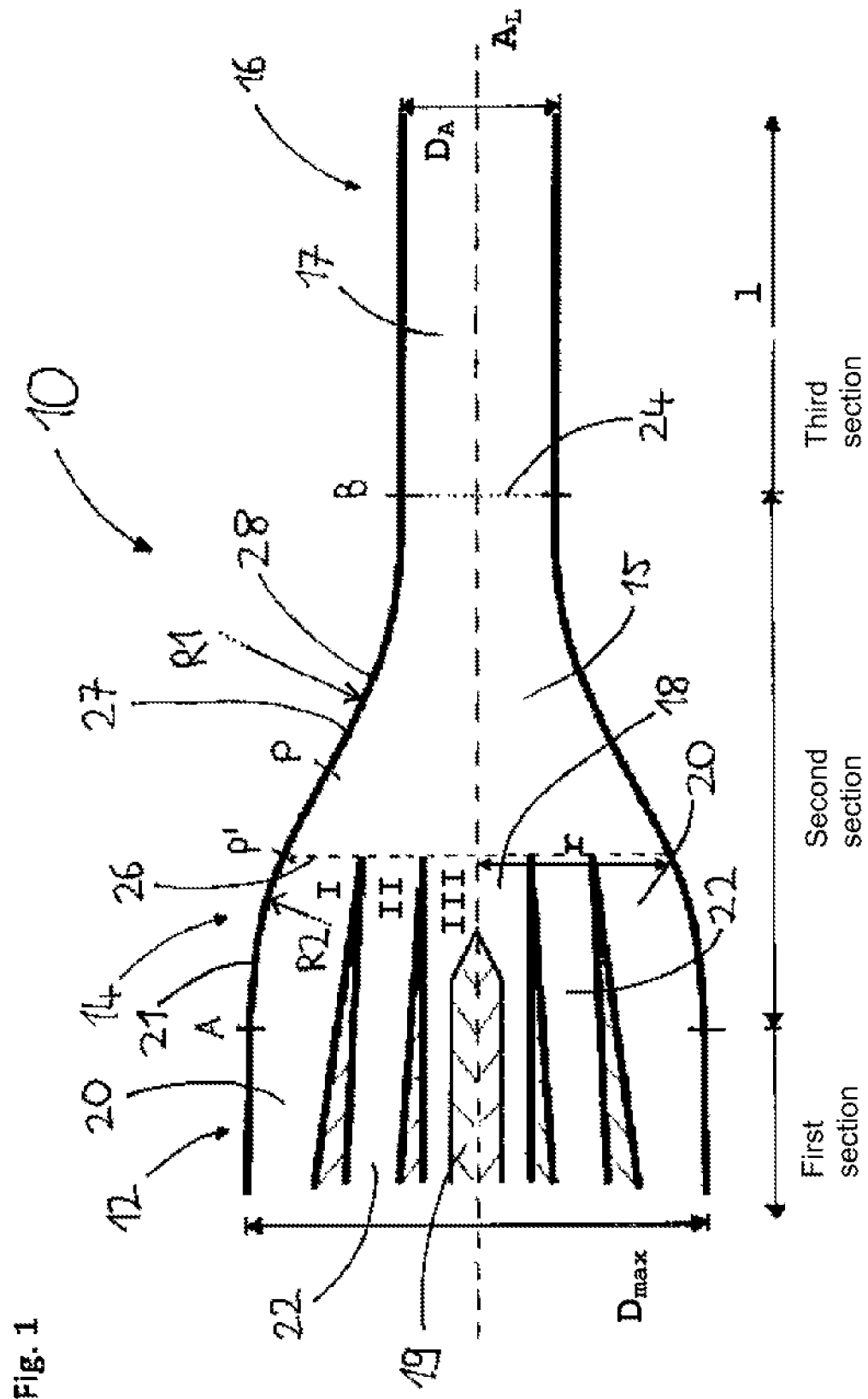
FIG. 1 illustrates a cross-sectional view of a device for carrying out the method of the present invention.

In a preferred embodiment, the second section of the device has a profile in cross section along the longitudinal axis $A_L$ which is described by two radii R1 and R2 which go tangentially over into one another, where the ratio of the radii R1 and R2 to the diameter $D_A$ of the outlet is defined as $0.8 < R1/D_A < 2.0$ and $1.0 < R2/D_A < 3.0$.

The profile of the second section is an outer wall of a hollow volume in the interior of the device, which also comprises a mixing zone in which thorough mixing of the media participating in the hydrolysis takes place. A profile subsection described by the radius R2 adjoins, in particular tangentially, a wall of the outer channel in the first section running straight in the profile, preferably parallel to the axis $A_L$. A profile subsection described by the radius R1 adjoins, in particular tangentially, the outlet having its diameter $D_A$.

It has been found that the configuration according to the invention of the profile of the second section prevents, during operation of the device, the occurrence of recirculation zones, backflow zones and dead zones in the region of the outer wall of the hollow volume. Prolonged contact of both the compound to be hydrolyzed and the hydrolysis products with the outer wall is prevented in this way. The formation of deposits on the outer wall is prevented in the immediate vicinity of the outer wall by the short contact time and the high flow velocities. This ensures long times on stream since interrupting operation of the device for cleaning purposes is superfluous.

The specific geometric configuration of the device of the invention leads to formation of a mixing zone of minimal size in which the components participating in the hydrolysis are mixed and which is located at a sufficient distance from the outer wall. Furthermore, recirculation zones, backflow zones and dead zones which promote the formation of deposits, especially of hydrolysis products, do not occur.

In a further embodiment, the device comprises at least one further intermediate channel which is located between the outer channel and the central channel and coaxially surrounds the central channel. The device preferably comprises eight, particularly preferably four, in particular two, further intermediate channels. The device is particularly preferably a device having a total of three channels, i.e. one further intermediate channel.

The channels preferably open into the second section of the device at least partially at about the height of the point of inflection of the radii R1 and R2 which go tangentially over into one another. Here, "at least partially" means that not all channels necessarily open into the second section at the height of this point. At least the central channel preferably opens into the second section at the height of the point of inflection. Furthermore, preference can be given to the channels opening into the second section at the height of a point which lies on the profile subsection described by the radius R2.

Between the outlet and the point at which the channels open into the second section, in particular at the point of inflection, a mixing zone in which thorough mixing of the compound to be hydrolyzed with water commences can be defined. It has been found that contact between an outer wall of the mixing zone and the compound to be hydrolyzed or the hydrolysis products is very largely avoided by means of this configuration. Furthermore, particularly intensive mixing in the interior region of the mixing zone, in particular the region close to the axis, is realized in this way.

It is possible to provide for at least one channel to open into the second section at a height at which the first section goes over into the tapering second section of the device. Preference is given to the outer channel opening into the second section at the height of this transition.

In a further embodiment, the channels have a constant or decreasing flow cross section up to the entry into the second section. The various channels of the device can also have different configurations in respect of this property. The flow cross section of the outer channel preferably decreases to a size which corresponds to from 10 to 60%, preferably from 20 to 50%, in particular from 30 to 45%, of the size of an entry cross section. Particular preference is given to 40%.

The channels of the device can in principle have the same or different flow cross sections. In particular, the flow cross section of the outer channel and/or at least one intermediate channel can be greater than the flow cross section of the central channel.

There is preferably a ratio between a flow cross section at the outlet (at the entry of the outer channel into the second section) of the outer channel $A_{outer}$ and a flow cross section of the outlet $A_A$ of $0.3<A_{outer}/A_A<20$; particularly preferably $1.0<A_{outer}/A_A<10$; in particular $2.0<A_{outer}/A_A<8.0$.

In a further embodiment, the ratio of the diameter of the first cylindrical section $D_{max}$ and the diameter of the nozzle outlet $D_A$ is defined as $1<D_{max}/D_A<8$, preferably $1.5<D_{max}/D_A<6$, particularly preferably $2<D_{max}/D_A<5$.

A third cylindrical section having a length l of $0<l/D_A<100$, preferably $3<l/D_A<40$, particularly preferably $5<l/D_A<20$, is preferably arranged downstream of the outlet. This is, in particular, a tube or hose whose internal diameter preferably corresponds to the diameter of the outlet $D_A$.

The third cylindrical section ensures, in particular, that any heat of reaction liberated during the hydrolysis can be transported away. The third section is therefore preferably made of a heat-resistant material, for example stainless steel.

The hydrolysis preferably takes place in a temperature range up to a maximum of 200° C.

The device can be made in one piece or made up of a plurality of pieces. The third cylindrical section, in particular in the form of a tube, is preferably detachably joined to the second section, for example screwed on, adhesively bonded or clamped. In particular, the device can be a nozzle which comprises the first section and the second section and is preferably joined detachably to a tube which comprises the third section.

In a further embodiment, a punching device which can be moved along the axis $A_L$ in order to remove deposits is arranged in the central channel. Deposits can be removed mechanically in this region by moving the punching device in the direction of the outlet. The punching device can be moved either manually or automatically, for example after particular time intervals by means of an electric motor. The punching device is preferably cylindrical and preferably has a cross-sectional area which is smaller than the flow cross section of the central channel. In this way, liquid can continue to pass through the central channel during operation of the device even when the punching device is moved in the direction of the outlet. Switching-off of the device for cleaning purposes is made superfluous thereby.

The punching device is, however, preferably arranged in such a way that it does not decrease the flow cross section of the central channel in the drawn-back state (normal operation). This can, for example, be ensured by the central channel having a lateral liquid inlet which is arranged upstream of the punching device (in the direction of the outlet of the channel).

A further aspect of the invention provides a method for hydrolyzing at least one compound, in which water is conveyed at least through the outer channel and the compound to be hydrolyzed is conveyed through the central channel and/or through at least one intermediate channel by means of the device described and these are at least partially mixed with one another in the second section. The compound and the water are in each case present as liquid.

It has been found that the hydrolysis of a compound using the device is particularly effective when all components participating in the hydrolysis are mixed with one another exclusively in the liquid state. Through mixing of the components is usually effected by atomization of at least one component. Furthermore, it is usual to add a gas, which generally does not participate in the hydrolysis, to the components to be mixed. Mixing then occurs with formation of bubble flow. In particular, the introduction of an additional gas can be associated with an increased outlay in terms of apparatus. This outlay is dispensed with in the present case. A further disadvantage of atomization is that a relatively large mixing zone is formed. As has been mentioned above, the mixing zone formed in the method of the invention is of minimal size.

A water shell along the profile of the second section, which reduces wall contact of the hydrolysis products to a minimum and immediately flushes away any deposits formed, is particularly advantageously produced by feeding in water through the outer channel which concentrically surrounds the central channel. In other words, the water shell surrounds the mixing zone being formed and essentially separates this from the outer wall of the hollow volume of the second section.

The method is in principle suitable for working up any type of hydrolyzable and/or water-soluble compounds. In particular, the method is suitable for compounds in the case of which solids which can lead to deposits in feed conduits or discharge conduits and thus lead to blockages are formed during the reaction with water.

The compound present as liquid can also be, in particular, in the form of an emulsion and/or suspension.

The compound is preferably selected from the group consisting of halosilanes (e.g. tetrachlorosilane), siloxanes (e.g. hexachlorosilane, pentachlorosilane) and mixtures thereof.

The method can particularly advantageously be used in the work-up of reaction products from the processes for producing semiconductors, in particular polysilicon, from the gas phase. It can likewise be employed advantageously for the destruction of aggressive distillation residues in organic and inorganic chemistry.

In a preferred embodiment, a channel conveying the compound to be hydrolyzed is flanked at least by a channel conveying water.

This ensures that the compound to be hydrolyzed forms, especially in the case of device embodiments having more than one intermediate channel, an interface with water immediately after exit from the channel, as a result of which particularly good mixing occurs in the mixing zone.

Particular preference is given to channels which convey the compound and channels which convey water being arranged in an alternating order. This configuration can be especially advantageous when there are a plurality of compounds to be hydrolyzed. The alternate introduction of water and the compound to be hydrolyzed through the channels of the device leads to particularly rapid mixing in the mixing zone.

The compound to be hydrolyzed and water are preferably conveyed through the channels at different flow velocities. The determination of the flow velocities is preferably carried out via a mass flow measurement, preferably by means of an orifice plate measurement, particularly preferably by means of a Coriolis mass flow measuring instrument. The flow velocities can be determined from the mass flow by means of the following equation.

$$V_i = \frac{\dot{m}_i}{\rho_i * A_i}$$

$A_i$ is the respective channel cross section perpendicular to the flow direction. $\rho_i$ is the density of the medium in the respective channel, which can be calculated on the basis of the known entry temperatures and composition of the medium.

As a result of the different flow velocities, a flow velocity profile (exit velocity profile) which has flow velocity gradients between the individual channels is generated at the exit of the components from the channels where the channels open into the second section. This results in intensive shear forces at the respective interfaces between water and the compound to be hydrolyzed, which bring about intensive and turbulent mixing of the components.

In a preferred embodiment, the absolute value of a difference between $V_V$ and $V_{H2O}$ for two adjacent channels of which one conveys the compound at an average exit velocity $V_V$ and one conveys water at an average exit velocity $V_{H2O}$ is defined as 0 m/s<$|V_V-V_{H2O}|$<200 m/s, preferably
2 m/s<$|V_V-V_{H2O}|$<100 m/s, particularly preferably
5 m/s<$|V_V-V_{H2O}|$<50 m/s.

The determination of the exit velocity is, as described above, preferably carried out by a mass flow measurement, using the cross sections at the outlet of the channels perpendicular to the flow direction, which preferably runs parallel to the channel axis, as basis.

There is preferably a difference between the average exit velocities of the components leaving the channels between all adjacent channels.

In a further embodiment, the water leaves the outer channel at an average exit velocity $V_{outer}$ of more than 0.5 m/s, preferably more than 2 m/s, particularly preferably more than 4 m/s. The average exit velocity at which the water leaves the outer channel produces high flow velocities in the vicinity of the outer wall of the hollow volume. These flow velocities can, in particular, also continue in the region of inner walls of the third section. Any deposits of hydrolysis products formed are thus flushed away. Blocking of the outlet and of the third section is prevented in this way and the time on stream of the device is increased.

Preference is given to a channel conveying the compound having a mass flow $\dot{m}_V$ and a channel conveying water having a mass flow $\dot{m}_{H2O}$, where a ratio of the sum of the mass flows $\Sigma\dot{m}_{Vi}$ of all channels conveying the compound and the sum of the mass flows $\Sigma\dot{m}_{H2Oj}$ of all channels conveying water is defined as 0<$\Sigma\dot{m}_{Vi}/\Sigma\dot{m}_{H2Oj}$<1.0, preferably 0<$\Sigma\dot{m}_{Vi}/\Sigma\dot{m}_{H2Oj}$<0.5, particularly preferably 0<$\Sigma\dot{m}_{Vi}/\Sigma\dot{m}_{H2Oj}$<0.2.

Especially in the case of strongly exothermic reactions, the excess of water can ensure maximum temperatures in the mixing zone of less than 100° C. Complicated handling of particularly hot reaction products is thus dispensed with.

The advantages of the invention can be summarized as follows.

Deposits are avoided both in the region of the second section and also in the region of the third section. This increases the time on stream of the device of the invention by a factor of at least five compared to hydrolysis devices known from the prior art. The cleaning requirement is considerably reduced. A hydrocyclone usually has to be cleaned once per day. In contrast, the device of the invention has to be cleaned not more than once per week. The single-phase addition of all components participating in the hydrolysis in combination with the geometric configuration, in particular of the second section of the device, and the introduction of the components according to the method results in formation of a mixing zone of minimal size with homogeneous mixing. For the purposes of the present invention, "single-phase" means the addition of all components in liquid form. Owing to the compact mixing zone, the throughput of high boilers can be significantly increased in comparison with hydrocyclones previously used.

FIG. 1 shows a schematic cross-sectional depiction of the device 10 of the invention along a longitudinal axis $A_L$. The device 10 comprises a first cylindrical section 12 having a diameter $D_{max}$, a second tapering section 14 and a third cylindrical section 16 having a length l. The device 10 further comprises a central channel 18, an outer channel 20 which coaxially surrounds the central channel 18 and an intermediate channel 22 which coaxially surrounds the central channel. The first section 12 and the second section 14 are constituents of a nozzle which has an outlet 24 having a diameter $D_A$. The third section 16, which is not depicted in its entirety, is a reaction tube, for example a tube made of stainless steel, which adjoins and is flush with the outlet 24 and the internal volume 17 of which has the same diameter $D_A$. The ratio $l/D_A$ is 10. The ratio $D_{max}/D_A$ is 3.

The second section 14 into which the channels 18, 20, 22 open comprises a hollow volume 15 which extends from the outlet 24 to a preferably circular opening plane 26 of the channels 18, 20, 22. The second section 14 is defined by a profile 28 which extends between the points A and B and can be described by two radii R1 and R2 which go tangentially over into one another. P defines the point of inflection at which the two radii R1, R2 go over into one another. The profile 28 is in sections a wall 27 delimiting the hollow volume 15. The wall 27 is described by a profile section between the points B and P', where P' is the point of intersection of the opening plane 26 with the profile 28. A part of a wall 21 of the outer channel 20 between the points P' and A forms a further section of the profile 28. The ratio $R1/D_A$ is 1 and the ratio $R2/D_A$ is 2.

A punching device 19 which is preferably pointed at its front end is arranged in the central channel 18. This can be moved along the axis $A_L$ at least as far as the outlet 24 and serves to remove deposits which can occur during operation of the device 10, especially in the region of the hollow volume 15 and of the outlet 24. The dimensioning of the punching device 19 is such that a liquid can flow through the central channel 18.

Example 1

The chlorosilanes formed in the production of polysilicon (typically a mixture of tetrachlorosilane, disilanes and disiloxanes) were subjected to hydrolysis by means of water using a device 10 as depicted schematically in FIG. 1. Both the chlorosilanes and the water were fed as liquid into the device in a temperature range from 20 to 30° C. under a pressure of from about 1 to 3 bar absolute. Here, water was conveyed through the outer channel 20 and the intermediate channel 22, while the chlorosilanes were conveyed through the central channel 18.

Figure 2:
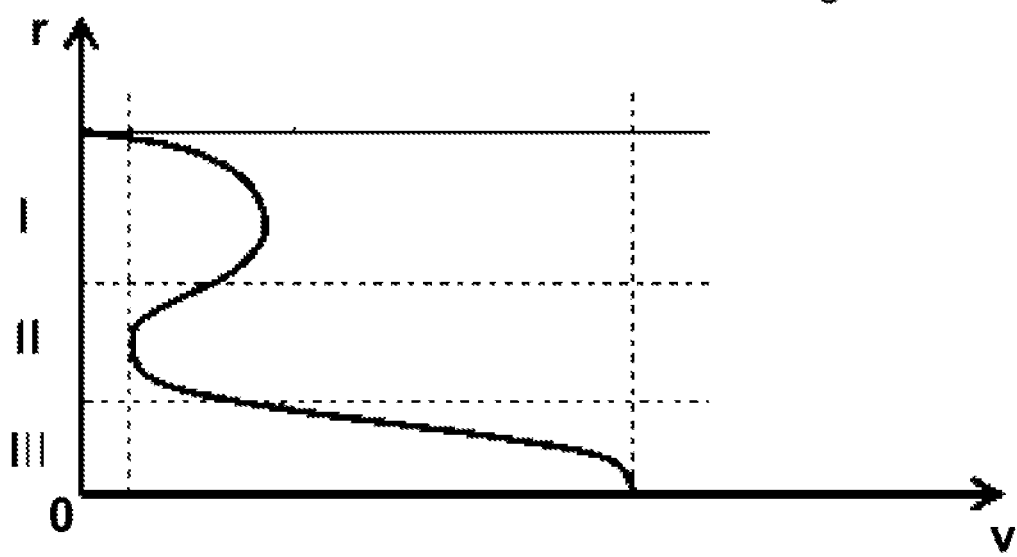
FIG. 2 shows the velocity profile of average exit velocities of liquids during the method of the invention.

FIG. 2 shows a velocity profile of the exit velocities of the liquids at the position of the opening plane 26 where the liquids enter the hollow volume 15 (cf. FIG. 1). The radius r of the circular opening plane 26 on the basis of FIG. 1 is plotted on the ordinate. The exit velocity v is plotted on the abscissa. The zone III (chlorosilane stream) shows the flow velocities of the central channel 18, while the zones II and I (water stream) correspond to the exit velocities of the intermediate channel 22 and the outer channel 20, respectively.

The chlorosilane stream in zone III has the highest average velocity (40 m/s), the water stream in zone II flanking this has the lowest average velocity (2 m/s). Owing to this difference, intensive shear forces arise at the interface of the two streams, as a result of which thorough mixing takes place immediately after leaving the channels. The particularly good mixing results in the hydrolysis being concluded in the region of the output 24. In this way the reaction tube serving for cooling can be kept short, which leads to a saving of materials.

The water stream from the outer channel 20 (zone I), which has a higher velocity (4 m/s) than the water stream from zone II, firstly encloses the mixing zone formed, in which, in particular, water from zone II and the chlorosilanes from zone III mix. This prevents hydrolysis products from being able to come into contact with the wall 27. The formation of deposits is thus largely avoided. Secondly, in conjunction with the specially configured profile 28, fast flow of water along the wall 27 is produced, by which means any deposits formed on the wall 27 are flushed away. The time on stream of the device is significantly increased. Compared to the hydrocyclones used hitherto, the time on stream could be increased by a factor of 7 to about 200 hours. The throughput of chlorosilanes could be increased by a factor 3 to 600 l/h.

Example 2

The chlorosilanes typically formed in the production of polysilicon were subjected to hydrolysis by means of water using the device shown in FIG. 1. The reaction conditions were identical to those in example 1.

Figure 3:
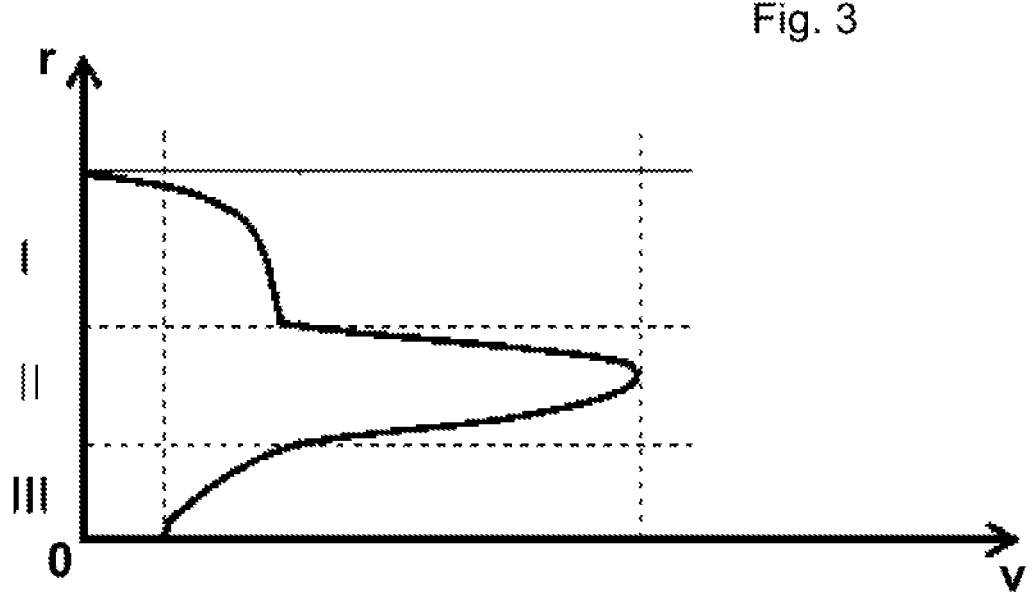
FIG. 3 shows the velocity profile of average exit velocities of liquids during the method of the invention.

However, according to FIG. 3, the chlorosilanes were, in contrast to example 1, conveyed through the intermediate channel 22 (zone II) at a maximum average exit velocity of 10 m/s. The chlorosilane stream was flanked by two water streams (zones I and III), with the water stream of the central channel 18 having the lowest exit velocity of 2 m/s. Here too, the large velocity difference brought about intensive mixing of the chlorosilanes with the water stream (zone III). Since the high boiler stream (zone II) is flanked on both sides by water, larger amounts of chlorosilanes could be reacted. Compared to the hydrocyclones previously used, the time on stream could be increased by a factor of 5 to 143 hours. The throughput of chlorosilanes could be increased by a factor of 6 to 1200 l/h.

The embodiment shown in FIG. 3 is particularly suitable for hydrolyzing compounds which are less problematical with regard to formation of deposits. As a result of the particularly large mixing zone formed in this embodiment, it is possible to achieve a very rapid hydrolysis reaction, so that a third section 16 in the form of a reaction tube may be able to be dispensed with.

Example 3

The chlorosilanes typically formed in the production of polysilicon were subjected to hydrolysis by means of water using the device shown in FIG. 1. The reaction conditions were identical to those in example 1.

The chlorosilanes were conveyed at an average exit velocity of 8 m/s through the central channel 18 (zone III). Water was conveyed at an exit velocity of 35 m/s through the intermediate channel 22 (zone II) and at an exit velocity of 3 m/s through the outer channel 20 (zone I). The velocity profile corresponded essentially to that shown in FIG. 3. Due to the large velocity difference between the zones III and II, intensive mixing occurs in the region of the hollow volume 15, with reaction products formed being kept away from the wall 27 by the water stream in the outer channel 20.

Compared to the hydrocyclones previously used, the time on stream could be increased by a factor of 10 to about 290 hours. The throughput of chlorosilanes was 200 l/h and thus at the value in the hydrocyclone previously used.

This embodiment is particularly suitable for hydrolyzing high boiler mixtures whose hydrolysis products have an increased tendency to form deposits. Here, mention may be made of, in particular, media which have relatively high concentrations of metal chlorides, e.g. $Al_2Cl_3$ or $TiCl_4$.

Example 4

The chlorosilanes typically formed in the production of polysilicon were subjected to hydrolysis by means of water using the device shown in FIG. 1. The reaction conditions were identical to those in example 1.

The chlorosilanes were conveyed through the intermediate channel 22 (zone II) at an average exit velocity of 2 m/s. The chlorosilane stream was flanked by two water streams (zones I and III), with the water stream in the central channel 18 having the highest exit velocity of 50 m/s. The velocity profile here corresponds essentially to that shown in FIG. 2. As regards mixing, reference may be made to what has been said for example 2. Compared to the hydrocyclones previously used, the time on stream could be increased by a factor of 8 to about 220 hours. The throughput of chlorosilanes could be increased by a factor of 3 to 600 l/h.

This embodiment is particularly suitable for hydrolyzing high boiler mixtures whose hydrolysis products have a very great tendency to form deposits. Here too, mention may be made of, in particular, media which have relatively high concentrations of metal chlorides, e.g. $Al_2Cl_3$ or $TiCl_4$. Furthermore, this embodiment is particularly suitable for strongly exothermic hydrolysis reactions, since the heat evolved can be removed quickly by the excess of water.

Comparative Example

The chlorosilanes typically formed in the production of polysilicon were subjected to hydrolysis by means of water using a hydrocyclone. The mode of operation and construction of the cyclone are known from DE 28 20 617 A1.

The halosilanes are sprayed into a cyclone through a free-hanging two-fluid nozzle with the aid of an inert gas, for example nitrogen. Due to a tangential addition of water at an upper end of the cyclone, the halosilane mixture comes into contact with water. Since the reaction between high boilers and water is an exothermic reaction, the water introduced is partially vaporized. The ascending water vapor moistens the two-fluid nozzle, as a result of which blockages which can lead to blocking of the two-fluid nozzle regularly occur. Owing to the large ratio between the wetted surface area of the cyclone and the volume stream of water, the reactants are not completely washed off (low flow velocities). This likewise leads to regular occurrence of blockages. The time on stream of the cyclone is therefore only about 28 hours. The throughput of chlorosilanes is 200 [l/h].

A further advantage of the device of the invention is the small cleaning requirement compared to the hydrocyclone, which is reflected in a shorter time on stream. While a maximum of only 2 hours are required for cleaning the device of the invention, a time of about 48 hours is required for cleaning the hydrocyclone. If the device of the invention is provided with a punching device for removing deposits, the time required for cleaning purposes can be reduced further since the punching device can remove blockages even during ongoing operation.

The invention claimed is:

1. A device (10) for hydrolyzing at least one compound, comprising: a first cylindrical section (12) having a diameter $D_{max}$, a central channel (18), an optional intermediate channel (22), and an outer channel (20) coaxially surrounding the central channel (18);
    an outlet (24) having a diameter $D_A$; and
    a second section (14) tapering in the direction of the outlet (24) and comprising a hollow volume (15) into which the channels (18, 20, 22) open,
    wherein the second section (14) has, in a cross section along a longitudinal axis $A_L$ of the device (10), a profile (28) of an outer wall delimiting the hollow volume (15), which is described by two radii R1 and R2 which go tangentially over into one another, where a profile subsection described by R1 adjoins the outlet (24) and a profile subsection described by R2 adjoins a wall (21) of the outer channel (20) which runs straight in its profile and where $0.2<R1/D_A<4.0$ and $0.3<R2/D_A<5.0$.

2. The device of claim 1, wherein $0.8<R1/D_A<2.0$ and $1.0<R2/D_A<3.0$.

3. The device of claim 1, wherein from one to eight, intermediate channel(s) (22) which coaxially surround(s) the central channel (18) is/are arranged between the central channel (18) and the outer channel (20).

4. The device of claim 1, wherein the channels (18, 20, 22) open into the second section (14) at least partially at the height of a point of inflection P of the radii R1 and R2 going tangentially over into one another.

5. The device of claim 1, wherein the channels (18, 20, 22) have a constant or decreasing flow cross section up to the entry into the second section (14).

6. The device of claim 1, wherein there is a ratio between a flow cross section $A_{outer}$ of the outer channel (20) and a flow cross section $A_A$ of the outlet (24) of $0.3<A_{outer}/A_A<20.0$.

7. The device of claim 1, wherein $1<D_{max}/D_A<8$.

8. The device of claim 1, wherein a third cylindrical section (16) having a length l of $0<l/D_A<100$ is arranged downstream of the outlet (24).

9. The device of claim 1, wherein a punching device (19) which can be moved along the axis $A_L$ for removing deposits is arranged in the central channel (18).

10. The device of claim 1, wherein from one to two, intermediate channel(s) (22) which coaxially surround(s) the central channel (18) is/are arranged between the central channel (18) and the outer channel (20).

11. The device of claim 1, wherein a single intermediate channel (22) which coaxially surround the central channel (18) is arranged between the central channel (18) and the outer channel (20).

12. The device of claim 1, wherein there is a ratio between a flow cross section $A_{outer}$ of the outer channel (20) and a flow cross section $A_A$ of the outlet (24) of $1.0<A_{outer}/A_A<10.0$.

13. The device of claim 1, wherein $1.5<D_{max}/D_A<6$.

14. The device of claim 1, wherein a third cylindrical section (16) having a length l of $3<l/D_A<40$, is arranged downstream of the outlet (24).

15. A method for hydrolyzing at least one compound, comprising:
    conveying water at least through an outer channel (20);
    conveying the at least one compound to be hydrolyzed through a central channel (18) and/or through at least one intermediate channel (22) by a device (10) as claimed in claim 1; and mixing water and at least one compound, at least partially, with one another in a second section (14), where the at least one compound and water are present as liquid.

16. The method of claim 15, wherein a channel conveying the at least one compound is flanked at least by a channel conveying water.

17. The method of claim 15, wherein channels conveying the at least one compound and channels conveying water are arranged in an alternating order.

18. The method of claim 15, wherein the absolute value of a difference between $V_V$ and $V_{H2O}$ for two adjacent channels of which one conveys the at least one compound at an average exit velocity $V_V$ and one conveys water at an average exit velocity $V_{H2O}$ is 0 m/s<$|V_V-V_{H2O}|$<200 m/s.

19. The method of claim 15, wherein water leaves the outer channel (20) at an average exit velocity $V_{outer}$ of more than 0.5 m/s.

20. The method of claim 15, wherein the channel conveying the at least one compound has a mass flow $\dot{m}_V$ and the channel conveying water has a mass flow $\dot{m}_{H2O}$, where a ratio of the sum of the mass flows $\Sigma\dot{m}_{Vi}$ of all channels conveying the at least one compound and the sum of the mass flows $\Sigma\dot{m}_{H2Oj}$ of all channels conveying water is 0<$\Sigma\dot{m}_{Vi}/\Sigma\dot{m}_{H2Oj}$<1.0.

21. The method of claim 15, wherein the absolute value of a difference between $V_V$ and $V_{H2O}$ for two adjacent channels of which one conveys the at least one compound at an average exit velocity $V_V$ and one conveys water at an average exit velocity $V_{H2O}$ is 5 m/s<$|V_V-V_{H2O}|$<50 m/s.

22. The method of claim 15, wherein water leaves the outer channel (20) at an average exit velocity $V_{outer}$ of more than 2 m/s.

23. The method of claim 15, wherein the channel conveying the at least one compound has a mass flow $\dot{m}_V$ and the channel conveying water has a mass flow $\dot{m}_{H2O}$, where a ratio of the sum of the mass flows $\Sigma\dot{m}_{Vi}$ of all channels conveying the at least one compound and the sum of the mass flows $\Sigma\dot{m}_{H2Oj}$ of all channels conveying water is 0<$\Sigma\dot{m}_{Vi}/\Sigma\dot{m}_{H2Oj}$<0.5.

24. The method of claim 15, wherein the at least one compound is a mixture of chlorosilanes.

* * * * *

UNITED STATES PATENT AND TRADEMARK OFFICE
CERTIFICATE OF CORRECTION

PATENT NO. : 10,730,033 B2
APPLICATION NO. : 16/488144
DATED : August 4, 2020
INVENTOR(S) : Goran Klose et al.

Page 1 of 1

It is certified that error appears in the above-identified patent and that said Letters Patent is hereby corrected as shown below:

In the Claims

Column 11, Line 20, Claim 20:
After "one compound has a mass flow"
Delete "thy" and
Insert -- $m_v$ --

Signed and Sealed this
Twenty-second Day of December, 2020

Andrei Iancu
*Director of the United States Patent and Trademark Office*